J. L. HALLINAN.
FEEDING DEVICE FOR MIXERS.
APPLICATION FILED MAR. 6, 1917.
1,287,976.
Patented Dec. 17, 1918.
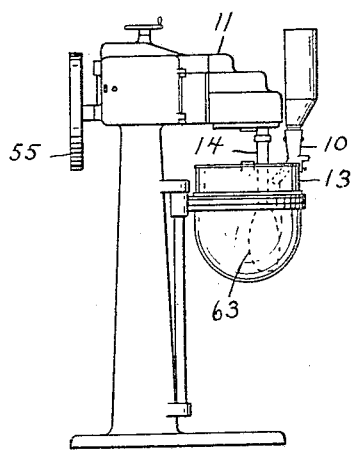
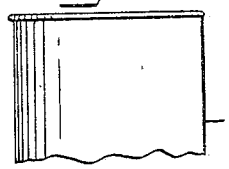
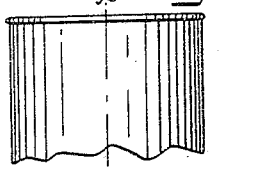
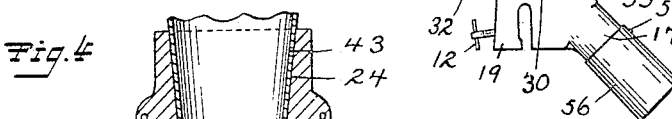
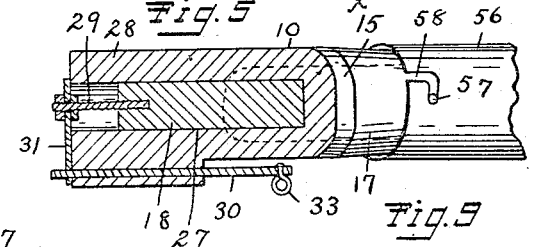
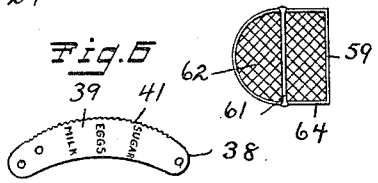
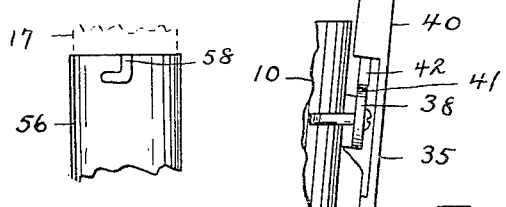
Inventor:
Jeremiah Lawrence Hallinan.
By Louis M. Schmidt.
Atty.

UNITED STATES PATENT OFFICE.

JEREMIAH LAWRENCE HALLINAN, OF NEW BRITAIN, CONNECTICUT.

FEEDING DEVICE FOR MIXERS.

1,287,976.  Specification of Letters Patent.  Patented Dec. 17, 1918.

Application filed March 6, 1917. Serial No. 152,648.

*To all whom it may concern:*

Be it known that I, JEREMIAH LAWRENCE HALLINAN, a citizen of the United States, residing at New Britain, in the county of Hartford and State of Connecticut, have invented certain new and useful Improvements in Feeding Devices for Mixers, of which the following is a specification.

My invention relates to improvements in feeding devices for mixers, and the object of my improvement is to produce a device that can be used in combination with batter mixers such as are in general use in bake shops and which device is adapted to feed certain ingredients such as milk, eggs and sugar, to the mixture, and to effect such feeding gradually and in measured quantities, such feeding being effected automatically without attention on the part of the operator, and at the same time insuring a more effective use of materials and a superior product.

In the accompanying drawing:—

Figure 1 is a side elevation of a dough mixer provided with a feeding device embodying my invention.

Fig. 2 is a side elevation on an enlarged scale of the feeding device shown in Fig. 1 as viewed from the opposite side to that shown in the said figure.

Fig. 3 is a front elevation of the same.

Fig. 4 is a sectional view on the line $x\,x$ of Fig. 3.

Fig. 5 is a sectional view on the line $y\,y$ of Fig. 3.

Fig. 6 is a side elevation on a still further enlarged scale of the indicator plate.

Fig. 7 is a plan view of a portion of the spout extension, showing the slot for the bayonet joint.

Fig. 8 is a fragmentary view of certain parts shown in Fig. 3.

Fig. 9 is a plan view on a considerably reduced scale of the sifter for powdered sugar shown in dotted lines in Figs. 2 and 3.

My improved feeding device 10 for mixers as shown in Fig. 1 is used with a power driven mixer 11 and is provided with a clamping screw 12 by which screw it is clamped to the edge of the mixing vessel 13, the said vessel 13 being open at the top. The mixer 11 is provided with a paddle 63 that is extended into the said vessel 13 and travels around the middle portion thereof being supported by the vertical shaft 14.

The feeding device 10 comprises a body portion 15 having an upwardly extending mouthpiece 16 at the upper end, and an inwardly inclined spout 17 at the lower end. At the junction of the said mouthpiece 16 and spout 17 is a control valve 18, and below the said valve 18 is an enlargement 19 having a slot 20 for receiving the upper edge portion 21 of the vessel 13.

The clamping screw 12 passes through a threaded hole 22 in the outer wall 52 of the slot 20 and as shown is inclined suitably to engage said upper edge portion 21 adjacent the underside of the rolled or turned portion 54 thereof, in which is housed the wire 23.

The mixing vessel 13, as shown, is of the usual form, made of sheet material, and is supported in the usual manner by means of a ring engaged with the body portion, the upper edge portion 21 mentioned extending appreciably above the supporting ring and being of cylindrical form, also as shown, the extreme upper edge 54 being wired, as described.

Thus the feeding device, which is set astride the wired extreme upper edge 54, is positioned at an appreciable elevation relatively to the supporting ring mentioned.

An opening extends continuously through the body portion 15, being of tapered form for the portion 24 in the major part of the mouth piece 16, of uniform cross section for the portion 25 within the spout 17, and being restricted as shown for the intermediate portion 26 adjacent and just above the valve 18.

The said valve 18 is in the form of a piston valve, being housed in a bore 27 that extends across the restricted portion 26 and extends outwardly through an outwardly projecting neck 28.

Means for operating and setting the valve 18 are provided as follows:—

A valve stem 29 extends outwardly from the valve 18 and on the side of the body portion 15 and positioned generally parallel with the valve 18 is a connecting rod 30 that is connected on the outer end with the valve stem 29 by a cross piece 31. The body portion of the connecting rod 30 is operatively housed in the guide sleeve 32, and the inner end 33 is in the form of an eye that engages with the end 34 of the control lever 35.

The control lever 35 is pivotally supported from the body portion 15 by means of a screw 36, positioned at the lower middle portion, and the upper portion 37 extends upwardly across the indicator plate 38, the extreme upper part 40 serving as a handle.

The indicator plate 38 is positioned so that the upper end portion 37 passes along the outer face 39 thereof in its movement back and forth for changing the position of the valve 18, is provided on the said front face 38 with suitable markings for indicating the proper positions for feeding certain ingredients, and is provided with a curved and notched upper edge 41, concentric with the pivot 36 of the lever 35.

The lever 35 is provided with a spring plunger 42 that coöperates with the notched or toothed edge 41 for locking the control lever and valve 18 in any position to which the same may be set.

As shown, the indicator plate 38 is provided on its outer face 39 with markings for milk, eggs and sugar in the order named.

The tapered opening or mouth 24 on the mouth piece 16 is adapted to receive the correspondingly tapered lower end 43 that serves as the outlet of the hopper 44, the body portion 45 of which is enlarged and of suitable size to contain the desired quantity of material, and furthermore is provided with a flat inner face 46 on the side opposed to the operating shaft 14 for the stirring or mixing paddle so as to provide clearance for the free operation of the same.

My feeding device as described is adapted for feeding such ingredients as milk, eggs, and granulated sugar, and may be used for other ingredients, the apparatus being set to a given opening of the valve for the proper feeding of each ingredient.

After being adjusted and started, the feeding is effected independently of the operator, the feeding being effected simultaneously with the stirring or mixing.

The feeding is regular and continuous, and under usual conditions at such a moderate rate that the material is quickly and thoroughly mixed with the batch. This feature I find to lead to important results, as the product is better and a more efficient use of materials is obtained.

The power mixer 11 is operated by means of a belt applied to the driving wheel 55 and is adapted to be used with mixing vessels of different size than the vessel 13 shown, and to adapt the feeding device 10 to the different vessels I make the spout 17 short and provide a spout extension 56 of suitable length, and of cylindrical form of suitable diameter to slip over the end of the spout 17 and to be retained in place by a suitable connection. For such connection as shown I use a bayonet joint, comprising a knob or lug 57 on the spout 17 that coöperates with an angled slot 58 in the end portion of the spout extension 56.

For feeding sugar I find it desirable to use a retarding device in the form of a sifter 64 that is housed in the hopper 46.

The sifter 64 as shown comprises a frame 59 that fits within the walls of the lower tapered part 60 of the hopper 46, and is provided with a loop handle 61, the space inclosed by the frame 59 being bridged by a sifting structure 62 of cross-wires or any other suitable form of construction.

By providing the sifter as shown and described the pressure due to the weight of the sugar in the hopper is held back from the relatively narrower passages below the hopper, and the packing of the sugar due to such pressure is avoided.

In the operation of the power mixer 11 and machines of its class to which my feeding device is adapted there is an appreciable vibration while the machine is in operation, and such vibration or jarring effects an agitation that facilitates appreciably the feeding of sugar and ingredients generally made up of solid particles.

I claim as my invention:—

1. In a feeding device for a mixer, a body having means for being supported from the edge of a mixing vessel and provided with a passage through which ingredients are delivered to the said vessel, a spout at the lower end of the said body, a mouth piece for supporting a hopper at the upper end thereof, and a valve for controlling the said passage intermediate of said mouth piece and spout, a lever for controlling the said valve, a spring plunger mounted on the said lever, the said mouth piece being an elongated structure, serving as a support for the said lever, and a locking plate supported by the said mouth piece, having one edge concentric with the pivotal support for the said lever and provided with teeth for coöperating with the said spring plunger.

2. A feeding and mixing machine comprising a support, a container supported thereby having vibratory walls, a regulated feeding mechanism mounted on said walls, an agitating mechanism adapted to operate within said container and adjacent said walls, and power driven actuating mechanism adapted to operate said agitating mechanism and in coöperation with the said agitating mechanism to cause said walls to vibrate to effect the feeding operation.

JEREMIAH LAWRENCE HALLINAN.

Witnesses:
VIVIAN M. STARK,
ROGER W. EDWARDS.